United States Patent
Sonoyama et al.

(10) Patent No.: US 6,941,200 B2
(45) Date of Patent: Sep. 6, 2005

(54) AUTOMATED GUIDED VEHICLE, OPERATION CONTROL SYSTEM AND METHOD FOR THE SAME, AND AUTOMOTIVE VEHICLE

(75) Inventors: Osamu Sonoyama, Osaka (JP); Takahiro Yokomae, Nara (JP); Yoichi Sugitomo, Hyogo (JP); Masahide Yoshihara, Osaka (JP); Osamu Matsushima, Osaka (JP); Toyotoshi Tsujikawa, Osaka (JP); Takeshi Asano, Osaka (JP); Hitoshi Kubota, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/398,547

(22) PCT Filed: Oct. 15, 2001

(86) PCT No.: PCT/JP01/09048

§ 371 (c)(1), (2), (4) Date: Jun. 16, 2003

(87) PCT Pub. No.: WO02/33498

PCT Pub. Date: Apr. 25, 2002

(65) Prior Publication Data

US 2004/0122570 A1 Jun. 24, 2004

(30) Foreign Application Priority Data

Oct. 16, 2000 (JP) .......................... 2000-315950

(51) Int. Cl.$^7$ .............................................. G01C 22/00
(52) U.S. Cl. ........................................ 701/23; 701/200
(58) Field of Search ........................... 701/23, 200, 211

(56) References Cited

U.S. PATENT DOCUMENTS

| | | |
|---|---|---|
| 4,780,817 A | 10/1988 | Lofgren |
| 5,245,335 A | 9/1993 | Hill et al. |
| 5,315,517 A | 5/1994 | Kawase et al. |
| 5,659,779 A | 8/1997 | Laird et al. |
| 2003/0069648 A1 * | 4/2003 | Douglas et al. ............... 700/2 |

* cited by examiner

Primary Examiner—Yonel Beaulieu
(74) Attorney, Agent, or Firm—Hamre, Schumann, Mueller & Larson, P.C.

(57) ABSTRACT

A waiting time of an automated guided vehicle is substantially eliminated by significantly shortening the communication time of various information, and the transport efficiency of an automated guided vehicle as well as the operating rate of work stations and production lines as a whole are improved, and in addition, the flexibility of an operation control system for the automated guided vehicle is improved. An automated guided vehicle (1) includes a wireless local area network adapter (11) for passing information by radio with an operation control unit connected to the local area network or with another automated guided vehicle, a memory part (12) for storing at least information from the operation control unit or from another automated guided vehicle and information related to the automated guided vehicle itself, and a control part (14) for controlling the wireless local area network adapter and the memory part.

20 Claims, 11 Drawing Sheets

| AGV Name | Position | Status |
|---|---|---|
| AGV1 | ⑪ | In Transport |

| AGV Name | Position | Status |
|---|---|---|
| AGV2 | ⑫ | In Transport |

| AGV Name | Position | Status |
|---|---|---|
| AGV3 | ⑬ | Waiting for Transport Request |

| Area Number | Entering AGV Name |
|---|---|
| 1 | AGV1 |
| 2 | |
| | |

FIG. 8

| Area Number | Name of AGV in Occupation | Name of AGV waiting to enter (Priority) | |
|---|---|---|---|
| 1 | AGV1 | AGV2(P3) | AGV3(P1) |
| 2 | | | |
| | | | |

FIG. 9

AUTOMATED GUIDED VEHICLE, OPERATION CONTROL SYSTEM AND METHOD FOR THE SAME, AND AUTOMOTIVE VEHICLE

FIELD OF THE INVENTION

The present invention relates to a plurality of automated guided vehicles or automotive vehicles that have the function of self-running, and an operation control system and method for these vehicles. In particular, the present invention relates to a technology for transmitting information between a plurality of automated guided vehicles and their control units, as well as among a plurality of automated guided vehicles.

BACKGROUND OF THE INVENTION

Conventionally, running control of an automated guided vehicle used for an automated guided vehicle system, which is intended to be automatized and laborsaving, generally employs a guidance system by fixed routes without tracks, which is advantageous in view of the cost and technology. Such fixed routes are determined by guidance lines, for example guidance tapes attached on the floor of an unmanned warehouse or a factory. An automated guided vehicle runs automatically along the guidance lines while detecting the guidance lines electromagnetically or by means of an optical system using a line detection sensor. Such guidance lines are generally formed as continuous or circular running routes and designed such that short-circuit running paths and charging areas are provided at several places along the route. At appropriate positions outside and along the circular guidance lines, a plurality of work stations are positioned for loading and unloading articles to be transported, and charging stations are positioned inside the circular path.

Furthermore, a plurality of automated guided vehicles are positioned on the above-mentioned guidance lines. When a transport request is given to an operation control unit from a factory host computer that controls factory facilities and work stations via a local area network (LAN), after running data and information related to the transport is given from the operation control unit by radio, these automated guided vehicles start running based on a start instruction to conduct an instructed transport or work order.

Now, the conventional system of transmitting information between the operation control unit and the automated guided vehicle is a communication system in which the control part of the operation control unit is connected to a radio with a cable conformable to RS232C, the control part of the automated guided vehicle also is connected to a radio with a cable conformable to RS232C, and the radios communicate with each other, for example, with a SS radio system (spread spectrum system). The control part of the operation control unit transmitted a command to the radio with serial communication via the RS232C cable, and the radio of the operation control unit transmitted the command by radio with the SS radio system to the radio of the automated guided vehicle, and thus, the control part of the automated guided vehicle received the command from the operation control unit with serial communication via the RS232C cable.

FIG. 11 shows how information (command, status) is passed between an operation control unit and an automated guided vehicle and the contents of processing in a conventional transport start processing.

First, when a running data download (D/L) request is sent from an automated guided vehicle to an operation control unit, the operation control unit writes running data and additional information related to a transport into a memory and first transmits the running data to the automated guided vehicle. To confirm receipt of the running data, the automated guided vehicle sends a running data transmission acknowledgment to the operation control unit. Upon receiving this message, the operation control unit then transmits the additional information to the automated guided vehicle. To confirm receipt of the additional data, the automated guided vehicle sends an additional information transmission acknowledgment to the operation control unit.

Thus, the running data and the additional information are transmitted to the automated guided vehicle, so that the operation control unit sends a start instruction to the automated guided vehicle after confirming that the automated guided vehicle is ready to start. To confirm receipt of the start instruction, the automated guided vehicle sends a start instruction acknowledgment to the operation control unit and starts running. The automated guided vehicle runs from the present position to an instructed loading station in an empty state, receives an article to be transported in the loading station, transports this article to be transported to an instructed unloading station, and supplies the article to the station concerned. Thereafter, the automated guided vehicle sends a transport completion notice to the operation control unit, thereby completing the designated transport.

Next, it will be explained as to how an automated guided vehicle is controlled when entering an area where guidance lines are merged.

FIG. 12 shows how information is passed between an operation control unit and an automated guided vehicle and contents of processing in a conventional merging control processing.

When an automated guided vehicle intends to enter a merging area of guidance lines, first, the automated guided vehicle sends a start allowance request to an operation control unit. Upon receiving this message, the operation control unit confirms whether there is any other automated guided vehicle in the requested target area for entering other than the automated guided vehicle that issued the start allowance request. If there is no other vehicle, the operation control unit immediately sends a start allowance to the automated guided vehicle. On the other hand, in the case where there is an automated guided vehicle in the requested target area for entering other than the automated guided vehicle that issued the start allowance request, the operation control unit waits until the other automated guided vehicle exits the requested target area for entering, then stores that the automated guided vehicle that issued the start request will occupy the area concerned, and sends a start allowance to the automated guided vehicle.

However, in the conventional information transmission system, the amount of communication per unit time was small, and it took a lot of time until an instruction for operation was given to an automated guided vehicle. There was also a waiting time on the side of the automated guided vehicle, so that the transport capability of the automated guided vehicle was reduced disadvantageously.

For example, in the case of the conventional communication by way of RS232C, a data transmission rate was 9.6 Kbps, and it took about 3 seconds to transmit running data from the operation control unit to the automated guided vehicle and about 0.5 second for transmission of a start instruction, so that a total of about 3.5 seconds was required.

Therefore, a waiting time of about 3.5 seconds was necessary from the time a transport is completed until the next transport starts.

Furthermore, for the operation control unit to access status data such as in trouble, in transport, in transfer, stopping, charging, under manual operation and standby stored in the memory of the automated guided vehicle and to update the content thereof could take 0.5 second per vehicle. When there are, for example, 20 units of automated guided vehicles, it would take about 0.5×20=10 seconds.

Furthermore, the automated guided vehicle runs from the time 20 units of automated guided vehicles intend to enter a designated area until a start allowance is given at an average distance L of L=20×0.5 sec×0.66=6.6 m by setting the speed of the automated guided vehicle to be 40 m/minute. Therefore, for conducting a blocking control to avoid collisions between the automated guided vehicles, it was necessary either to provide a confirmation section of at least about 6.6 m for communication to confirm whether it is allowed to enter just before entering the designated area, or to stop the automated guided vehicle every time at the entrance of the designated area to confirm whether it is allowed to enter so as to send a start instruction. Therefore, there was a problem of loss in area productivity due to the extra running space of the confirmation section, and there was also a problem of loss in time since the automated guided vehicles stopped at the entrance every time even if there was no other automated guided vehicle in the designated area.

Moreover, when the operation control unit tries to read a large volume of data such as manipulation records and operating records stored in the automated guided vehicle for analysis of troubles with the automated guided vehicle, it takes a long time for communication, so that the waiting time of the automated guided vehicle increased, which led to the deterioration of the transport capability.

Furthermore, in order to reflect the result of the above-mentioned trouble analysis to the automated guided vehicle, a built-in ROM of the automated guided vehicle in which the transport control software is stored needed to be exchanged. In this case, the ROM exchange was carried out by stopping the transport for each automated guided vehicle, so that it required a stop time for the automated guided vehicles and also work by manpower, during which the production line had to be stopped disadvantageously.

In addition, another problem of the conventional information transmission system was that processing (communication process) for radio communication was needed. Communication protocols had to be determined for respective communication data, so that every time the type of communication data increased, the communication protocols needed to be revised.

Furthermore, communication processes are required for both the operation control unit and the automated guided vehicle, and thus, it is necessary to make an investment in the development of software for each.

Furthermore, for achieving higher communication efficiency, the structure regarding software for communication processes had to be changed to a polling system of high-speed processing, a mutual competitive communication system or the like, which disadvantageously led to a more complicated structure.

Moreover, when the content of communication is to be changed, the communication protocols and the communication process need to be modified or added.

SUMMARY OF THE INVENTION

It is an object of the present invention to solve the above-mentioned problems by providing an operation control system and method in which the waiting time of an automated guided vehicle is substantially eliminated by significantly shortening the communication time for various information, the transport efficiency of an automated guided vehicle as well as the operating rate of work stations and production lines as a whole are improved, and the flexibility related to an automated guided vehicle and an operation control unit is improved. Another object is to provide such an automated guided vehicle and an automotive vehicle.

To achieve the above-mentioned objects, an automated guided vehicle of the present invention is an automated guided vehicle for conducting a transport of articles or other work by running a designated running route, and the automated guided vehicle includes a wireless local area network adapter for passing information by radio with an external device connected to the local area network or with another automated guided vehicle, a memory part for storing at least information from the external device or from the another automated guided vehicle and information related to the automated guided vehicle by itself, and a control part for controlling the wireless local area network adapter and the memory part.

According to this configuration, a large volume of information can be transmitted at high speed between the external device and the automated guided vehicle or among the automated guided vehicles via the wireless local area network (wireless LAN), so that the transport capability of the automated guided vehicle can be improved.

It is preferable that the automated guided vehicle of the present invention refers to and timely obtains information needed for running of the automated guided vehicle, which is stored in the external device or in another automated guided vehicle, by itself via the wireless local area network adapter, and that running control is conducted by itself based on the obtained information.

In this case, the information needed for running includes running data indicating running routes, information on start instructions for automated guided vehicles, area entry information that controls automated guided vehicles from entering a designated running area, information on transport requests for the automated guided vehicle, and running route change data for instructing a route change from the present running route to another running route.

It is preferable that the memory part stores information on the present position or status information indicating the present status such as in transport, standby etc., so that the external device refers thereto via the wireless local area network adapter and determines an automated guided vehicle to which a transport request is output.

When the automated guided vehicle obtains area entry information via the wireless local area network adapter, as information needed for running, the automated guided vehicle confirms whether there is any other automated guided vehicle in a designated area other than itself based on the obtained area entry information, and determines whether to enter the designated area based on the result of that judgement.

At this time, in the case where the automated guided vehicle confirms that there is no other automated guided vehicle in the designated area other than itself, and also in the case where the automated guided vehicle obtains area entry standby information that controls the entry standby of the designated area, which is stored in the external device or in another automated guided vehicle, when it is confirmed that there is no other automated guided vehicle other than itself with a higher priority based on the obtained area entry standby information, it is preferable that the automated guided vehicle updates the area entry information, which is stored in the external device or in another automated guided vehicle, by adding its own identification information thereto, enters the designated area and occupies the designated area.

According to this configuration, it is no longer necessary to provide a confirmation section of at least about 6.6 m (in the case of travel at 40 m/minute) for communication to confirm whether it is allowed to enter just before entering the designated area, or to stop the automated guided vehicle every time at the entrance of the designated area to confirm whether it is allowed to enter. Therefore, it is not necessary to provide a confirmation section, and the area productivity also is improved since there is no need to provide extra space therefor. Furthermore, since an automated guided vehicle does not stop every time at the entrance of the merging area, the waiting time of the automated guided vehicle can be shortened significantly, and the transport efficiency can be improved.

On the other hand, in the case where the automated guided vehicle confirms that there is an automated guided vehicle in the designated area other than itself it is preferable that the automated guided vehicle updates the area entry standby information that controls the entry standby of the designated area, which is stored in the external device or in another automated guided vehicle, by adding its own identification information and priority thereto and waits to enter upstream of the designated area.

Moreover, the automated guided vehicle preferably includes detection means for detecting a mark or another distinction means on a running path located at a position before an entrance of the designated area sufficient to provide a running distance allowing stopping before the entrance, and the automated guided vehicle obtains area entry information also while running based on a detection of the distinction means by the detection means.

In the case where the automated guided vehicle timely obtains running route change data for instructing a route change from the present running route to another running route by itself via the wireless local area network adapter, as information needed for running, it is preferable that the automated guided vehicle runs by changing its running route to the instructed running route based on the obtained running route change data.

According to the above-mentioned configuration, the transport efficiency of the automated guided vehicle can be improved by obtaining from the external device not only the information needed for the present transport but also the information needed for the following transport at a timing corresponding to its own transport status.

Furthermore, it is preferable that the automated guided vehicle of the present invention enables the updating of transport control software stored in the memory part or rewriting data through remote processing via the local area network by the external device.

In this case, the automated guided vehicle includes a melody reproducing device for reproducing music data stored in the memory part, and the automated guided vehicle enables rewriting of the music data as appropriate through remote processing via the local area network by the external device.

According to the above-mentioned configuration, in the case where the ROM in which the built-in software of the automated guided vehicle is stored or the IC in which melody data etc. are stored is exchanged, it is no longer necessary as in the past to exchange the ROM or the IC by stopping the transport for each automated guided vehicle. By updating the transport control software or rewriting the melody data of all the automated guided vehicles from one external device, for example, a network computer, the stop time and the workload of the automated guided vehicle can be reduced significantly, and the stop time of the transport can be shortened significantly, so that the operating rate of the production line as a whole can be improved.

Furthermore, in the automated guided vehicle of the present invention, it is preferable that the information on start instructions or other messages passed with the external device or with another automated guided vehicle includes at least one selected from an identification number of the external device or of the another automated guided vehicle and a task identification number.

According to the above-mentioned configuration, the processing of any error message from another network computer, which is connected to the wireless local area network but does not contribute to the operation control, or from the automated guided vehicle can be prevented.

To achieve the above-mentioned object, an automotive vehicle of the present invention is an automotive vehicle with the function of self-running, and the automotive vehicle includes a wireless local area network adapter for passing information by radio with an external device connected to the local area network or with another automotive vehicle, a memory part for storing at least information from the external device or from another automotive vehicle and information related to the automotive vehicle itself, and a control part for controlling the wireless local area network adapter and the memory part.

According to this configuration, a large volume of information can be transmitted at high speed between the external device and the automotive vehicle or among the automotive vehicles via the wireless LAN, so that the running ability of the automotive vehicle can be improved.

It is preferable that the automotive vehicle of the present invention refers to and timely obtains information needed for running of the automotive vehicle, which is stored in the external device or in the another automated guided vehicle, by itself via the wireless local area network adapter, and that running control is conducted by itself based on the obtained information.

According to this configuration, the running ability of the automotive vehicle can be improved by obtaining not only the information needed for the present running but also the information needed for the following running at a timing corresponding to its own running status from the external device.

To achieve the above-mentioned object, an operation control system for an automated guided vehicle of the present invention is an operation control system for an automated guided vehicle including an automated guided vehicle for conducting a transport of articles or other work by running a designated running route and an external device for passing information by radio with the automated guided vehicle. The automated guided vehicle includes a wireless local area network adapter for passing information by radio with the external device connected to the local area network or with another automated guided vehicle. The external device or one of automated guided vehicles stores information on start instructions for the automated guided vehicle or other information needed for running. The automated guided vehicle refers to and timely obtains information needed for running, which is stored in the external device or in the another automated guided vehicle, by itself via the wireless local area network adapter, and running control is conducted by itself based on the obtained information.

According to the above-mentioned configuration, the automated guided vehicle can obtain not only the information needed for the present transport but also the information needed for the following transport at a timing corresponding to its own transport status from the external device, so that the transport efficiency of the automated guided vehicle can be improved.

To achieve the above-mentioned object, an operation control method for an automated guided vehicle of the present invention is a method for controlling an operation of an automated guided vehicle by passing information by radio between the automated guided vehicle for conducting a transport of articles or other work by running a designated running route and an external device connected to a local area network via the wireless local area network. The method includes the steps of storing information on start instructions for the automated guided vehicle or other information needed for running in the external device or one of automated guided vehicles, referring to and obtaining the information needed for running, which is stored in the external device or in another automated guided vehicle, via the wireless local area network in the automated guided vehicle, and conducting running control by itself based on the obtained information.

According to this method, the automated guided vehicle can obtain not only the information needed for the present transport but also the information needed for the following transport at a timing corresponding to its own transport status from the external device, so that the communication efficiency can be improved, and thus the automated guided vehicle needs is less likely to wait for communication, thereby improving the transport efficiency.

In the operation control method of the present invention, it is preferable that the method includes the steps of storing area entry information that controls the automated guided vehicle from entering a designated running area in an external device or one of the automated guided vehicles, obtaining the area entry information from the external device or another automated guided vehicle via the wireless local area network in the automated guided vehicle, confirming whether there is any other automated guided vehicle in the designated area other than itself based on the obtained area entry information, and determining whether to enter the designated area based on the result of judgement.

According to this configuration, it is no longer necessary to provide a confirmation section of at least about 6.6 m (for travel at 40 m/minute) for communication to confirm whether it is allowed to enter just before entering the designated area, or to stop the automated guided vehicle every time at the entrance of the designated area to confirm whether it is allowed to enter. Therefore, it is not necessary to provide a confirmation section, and the area productivity also can be improved since there is no need to provide extra space therefor. Furthermore, since an automated guided vehicle does not stop every time at the entrance of the merging area, the waiting time of the automated guided vehicle can be shortened significantly, and the transport efficiency can be improved.

BRIEF DESCRIPTION OF THE DRAWINGS

FIG. 8 is a schematic diagram showing one configuration example of an area entering status file.

FIG. 9 is a schematic diagram showing one configuration of blocking data.

DESCRIPTION OF THE PREFERRED EMBODIMENTS

Hereinafter, preferred embodiments of the present invention will be described with reference to the drawings.

Figure 1:
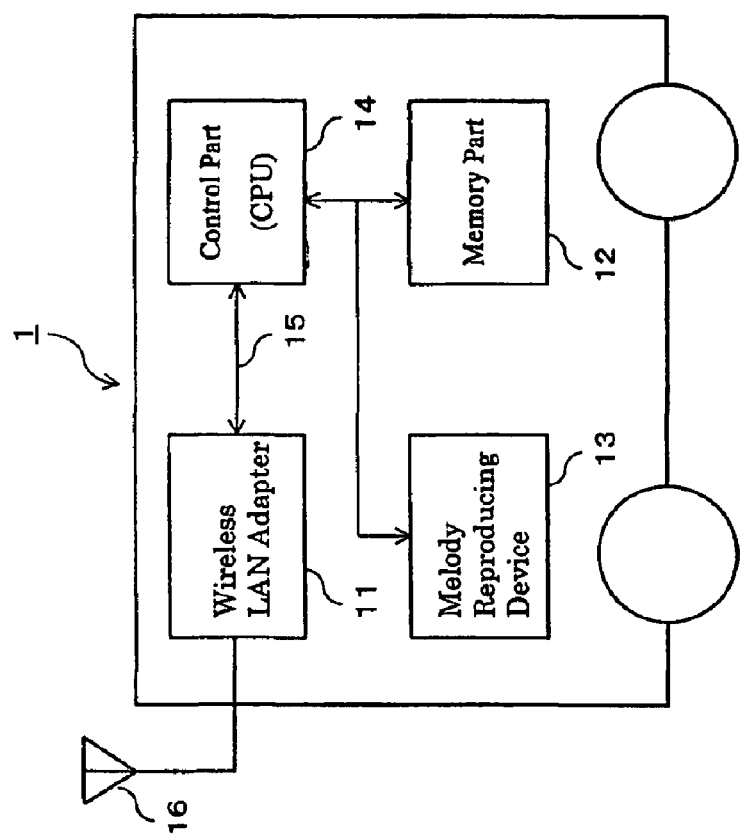
FIG. 1 is a schematic structural view showing the relevant portion of an automated guided vehicle 1 according to one embodiment of the present invention.

FIG. 1 is a schematic structural view showing a relevant portion of an automated guided vehicle 1 according to one embodiment of the present invention. In FIG. 1, 11 is a wireless local area network adapter (hereinafter abbreviated as wireless LAN adapter) for passing information by radio with a factory host computer, an operation control unit and an external device including a network computer, connected to the local area network, or with other automated guided vehicles 1. Here, 16 denotes an antenna connected to the wireless LAN adapter.

12 is a memory part that stores running data, information related to transports, information on start instructions, status data of the automated guided vehicle itself (e.g. in trouble, in transport, in transfer, stopping, charging, under manual operation, standby for a transport request), manipulation records and operating records obtained from the external device via the wireless LAN adapter 11, as well as transport control software, melody data or the like. The memory part 12 includes a rewritable memory and can be also either a SRAM, a flash ROM, a hard disk drive etc. or a combination thereof or a memory of a different configuration.

13 is a melody data reproducing device for reproducing melody data stored in the memory part 12 and outputting them as music, if necessary, while transporting and so forth.

14 is a control part including a CPU for controlling the automated guided vehicle as a whole, such as running control of the automated guided vehicle 1 according to the transport control software stored in the memory part 12. The control part 14 may be connected to the wireless LAN adapter 11 via an Ethernet cable, such as a common 10 BASET cable (an interface such as PCMCIA can be used as well), and controls the wireless LAN adapter 11 and the memory part 12 do as to store the running data transmitted from the external device via the wireless LAN adapter 11, the information related to transports, the information on start instructions etc. in the memory part 12 and to transmit the file information such as the status data, the manipulation records and the operating records read out from the memory part 12 to the external device via the wireless LAN adapter 11.

Furthermore, when the external device requests updating of the melody data stored in the memory part 12, the control part 14 controls the wireless LAN adapter 11 and the memory part 12 so as to store the melody data transmitted from the external device via the wireless LAN adapter 11 into the memory part 12.

Figure 2:
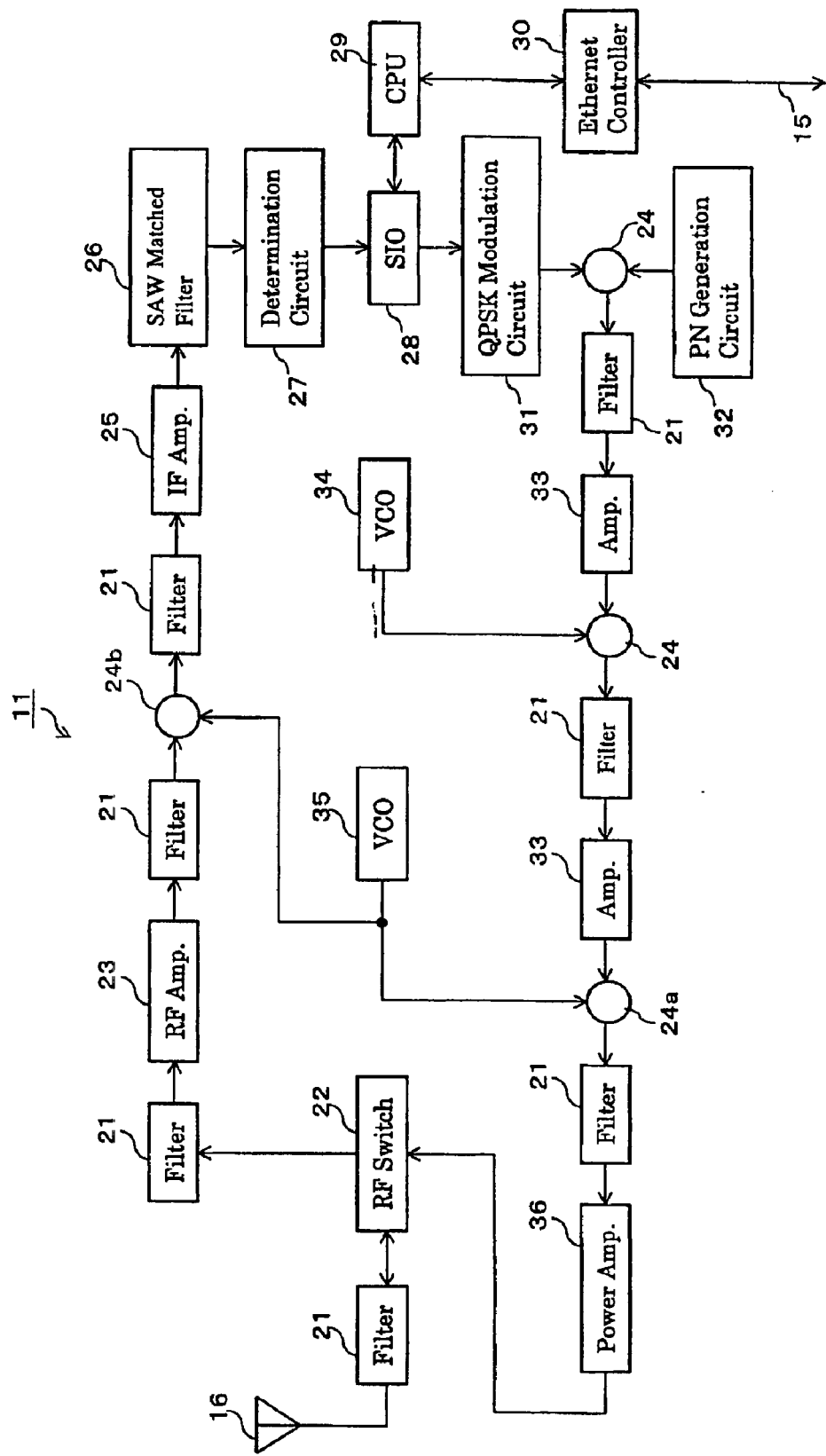
FIG. 2 is a block diagram showing the schematic configuration of a wireless LAN adapter 11 of FIG. 1.

FIG. 2 is a block diagram showing the schematic configuration of the wireless LAN adapter 11 of FIG. 1. In FIG. 2, 16 is a two-way antenna of radio-frequency signals (hereinafter abbreviated as RF signals, but it is not limited to RF signals and can be, for example, optical signals), 21 is a filter for suppressing unnecessary frequencies, and as the filter 21, for example, a band-pass filter or the like is used. 22 is a RF switch for switching between transmission and reception; 23 is a RF amplifier for amplifying RF signals to be received; 24a is a mixer serving as an up-converter for conversion of frequencies into higher spectra; 24b is a mixer serving as a down-converter for conversion of frequencies into lower spectra; 25 is an IF amplifier for amplifying intermediate-frequency signals to be received (hereinafter abbreviated as IF signals); 26 is a SAW (Surface Acoustic Wave) matched filter for demodulating spread spectrum signals; 27 is a determination circuit for converting demodulated signals into serial data; 28 is a conversion circuit for converting serial data into parallel data (hereinafter abbreviated as a SIO); 29 is a CPU for processing of data and control of each part; 30 is an Ethernet controller for passing data with the Ethernet cable 15 (other interface controllers such as a PCMCIA controller can be used as well); 31 is a modulation circuit for performing a primary modulation such as a quadrature phase shift keying (hereinafter abbreviated as a QPSK modulation circuit) on data signals; 32 is a generation circuit of pseudonoise codes (hereinafter abbreviated as a PN code) for performing spectral diffusion (hereinafter abbreviated as a PN generation circuit); 33 is an amplifier for amplifying transmission signals; 34 is a voltage control oscillator for generating IF reference signals (hereinafter abbreviated as a VCO); 35 is a VCO for generating RF reference signals; and 36 is a power amplifier for amplifying RF signals ultimately.

Next, the operation of the wireless LAN adapter 11 of the above-mentioned configuration will be described.

First, with respect to the transmission system, packet data flowing through the Ethernet cable 15 are subject to an address judgement by the Ethernet controller 30, and it is checked whether the data require a radio transmission. The data confirmed as requiring a radio transmission are sent to the SIO 28 after radio information is added thereto by the CPU 29. The SIO 28 converts a parallel data signal sent from the CPU 29 into a serial data signal. A phase modulation (primary modulation) of the converted serial data signal takes place in the QPSK modulation circuit 31. A spectral diffusion (secondary modulation) of the phase-modulated data signal is conducted by a PN code generated in the PN generation circuit 32 and the mixer 24.

The spread spectrum data signal (hereinafter abbreviated as a SS data signal) is sent to the filter 21 to reduce the noise and then amplified by the amplifier 33. The amplified SS data signal is converted to a higher spectrum in the mixer 24 with an IF reference signal generated in the VCO 34. The up-converted SS data signal is sent to the filter 21 to reduce the noise and then amplified by the amplifier 33.

The SS data signal amplified by the amplifier 33 is converted to a higher spectrum in the mixer 24a with a RF reference signal generated in the VCO 35. The up-converted SS data signal is sent to the filter 21 to reduce the noise and then amplified by the power amplifier 36 to a power needed for transmission. The SS data signal with an amplified power is sent to the filter 21 via the RF switch 22 to reduce the noise, converted into radio waves by the antenna 16, and transmitted to the external device or to another automated guided vehicles.

Next, with respect to the reception system, the SS data signal that is received by the antenna 16 from the external device or from another automated guided vehicle is sent to the filter 21 to reduce the noise, sent to the filter 21 via the RF switch 22 to reduce the noise again and then amplified by the RF amplifier 23 to a level that is suitable for signal processing. The SS data signal amplified by the RF amplifier 23 is sent to the filter 21 to reduce the noise again and down-converted to a lower spectrum in the mixer 24b with a RF reference signal generated in the VCO 35.

After the down-converted SS data signal is sent to the filter 21 to reduce the noise and amplified by the IF amplifier 25, a SS demodulation of the data signal takes place in the SAW matched filter 26, and a phase demodulation takes place in the determination circuit 27. The phase-demodulated data signal is converted by the SIO 28 from a serial data signal into a parallel data signal and sent to the CPU 29. An address judgement takes place in the CPU 29 based on the radio information of the transmitted data signal. As a result of this address judgement, the data requiring a wired transmission are sent to the Ethernet cable 15 through the Ethernet controller 30 after the radio information is removed from the data in the CPU 29.

In the following, the operation control system for the automated guided vehicle 1 including the wireless LAN adapter 11 as described above will be described.

Figure 3:
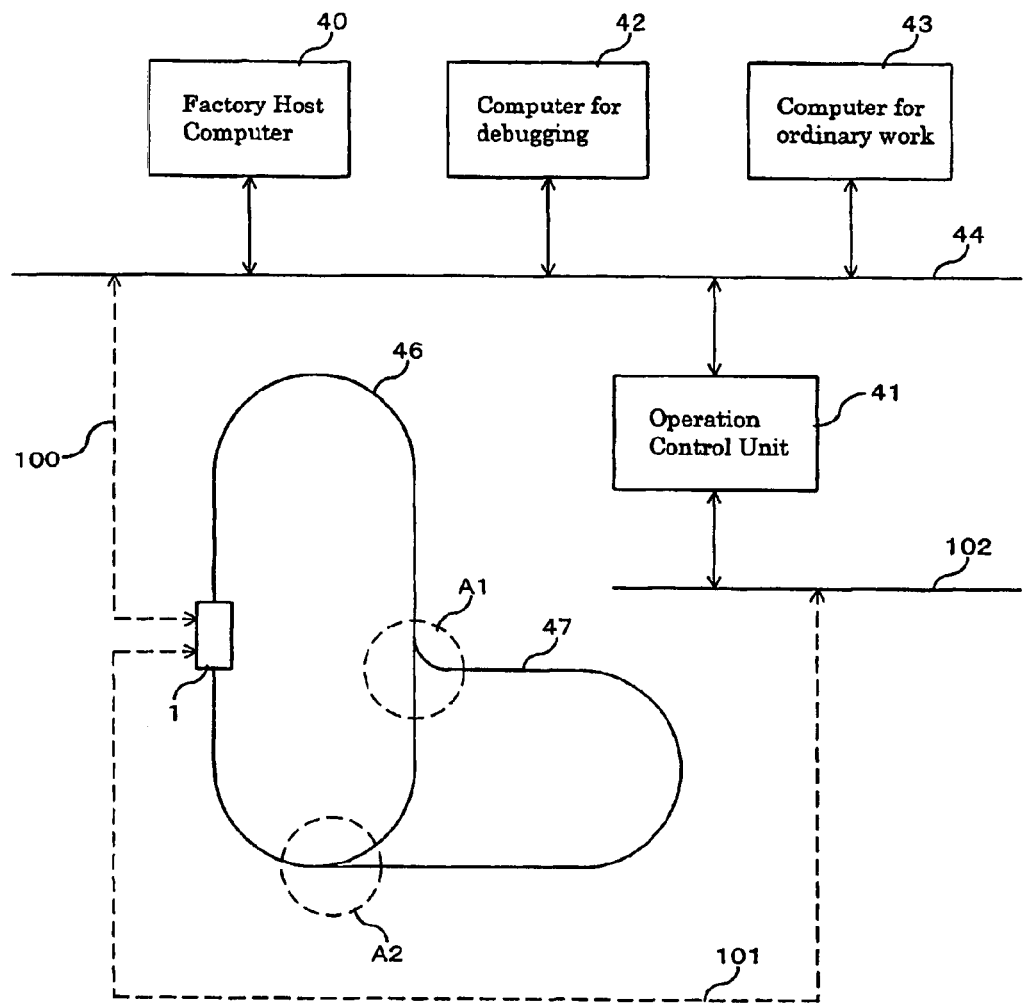
FIG. 3 is a schematic structural view showing a typical relevant portion of an operation control system for an automated guided vehicle according to one embodiment of the present invention.

FIG. 3 is a schematic structural view typically showing the relevant portion of an operation control system for an automated guided vehicle according to one embodiment of the present invention. FIG. 3 only shows one automated guided vehicle 1 for the purpose of simplifying the drawing, but in reality, a large number of automated guided vehicles are provided.

In FIG. 3, 40 is a factory host computer that controls factory facilities and work stations and sends transport requests for the automated guided vehicle 1. 41 is an operation control unit which, in response to a transport request sent from the factory host computer, transmits the information needed for running, including information on start instructions for the automated guided vehicle 1, corresponding to the condition of the automated guided vehicle 1 via a wireless LAN.

42 is a network computer for debugging used for updating the transport control software stored in the memory part 12 of the automated guided vehicle 1 or debugging it through remote control, rewriting data by transmitting melody data to the automated guided vehicle 1 and debugging the software of the operation control unit 41. 43 is a network computer for ordinary work that does not contribute to the control of the automated guided vehicle 1.

Here, the network computer for debugging 42 may also serve as the operation control unit 41 or the network computer for ordinary work 43.

46 and 47 are guidance lines for the automated guided vehicle 1. A1 and A2 are merging areas where the guidance lines 46, 47 are merged and where only one automated guided vehicle can enter at a time.

As shown in FIG. 3, the factory host computer 40, the operation control unit 41, the network computer for debugging 42, and the network computer for ordinary work 43 are all connected to the local area network (LAN) 44.

Furthermore, the operation control unit 41 has the same wireless LAN adapter 11 as that of the automated guided vehicle 1 shown in FIG. 2 and passes information by radio with the automated guided vehicle 1 via the wireless LAN. Therefore, the automated guided vehicle 1 is, as shown by a dotted line 101 in FIG. 3, connected to a LAN 102 that is connected to the operation control unit 41 and is therefore accessible also from the factory host computer 40 and the network computer for debugging 42 connected to the operation control unit 41 via the LAN 44. However, an access limit is programmed for the information stored in the automated guided vehicle 1 and the operation control unit 41 to prevent an illegal access from the network computer for ordinary work 43, which is connected to the LAN 44 but does not contribute to operation control.

In addition, the automated guided vehicle 1 may be connected to the LAN 44, as shown by a dotted line 100.

Furthermore, the information on start instructions and other messages transmitted from the operation control unit 41 or the automated guided vehicle 1 include an identification number of the operation control unit 41 or a task identification number. Thus, the automated guided vehicle 1 etc. that received a message can check the identification number included in the message and confirm whether it is an authorized message to be received or an error message. In this way, processing of any error message from the network computer for ordinary work 43, which is connected to the LAN 44 but does not contribute to operation control, or from the automated guided vehicle 1 is prevented.

Furthermore, by accessing all the automated guided vehicles from the network computer for debugging 42 via the network, an installation can be conducted for upgrading the transport control software or other software of the automated guided vehicle 1, so that it is no longer necessary as in the past to exchange the ROM in which the built-in software of the automated guided vehicle is stored or the IC in which melody data etc. are stored. Thus, the stop time and the workload of the automated guided vehicle can be reduced significantly, and the stop time of a transport can be shortened significantly, so that the operating rate of the production line as a whole can be improved.

Next, it will be explained as to how information is transmitted between the operation control unit 41 and the automated guided vehicle 1 when the automated guided vehicle 1 starts a transport.

Figure 4:
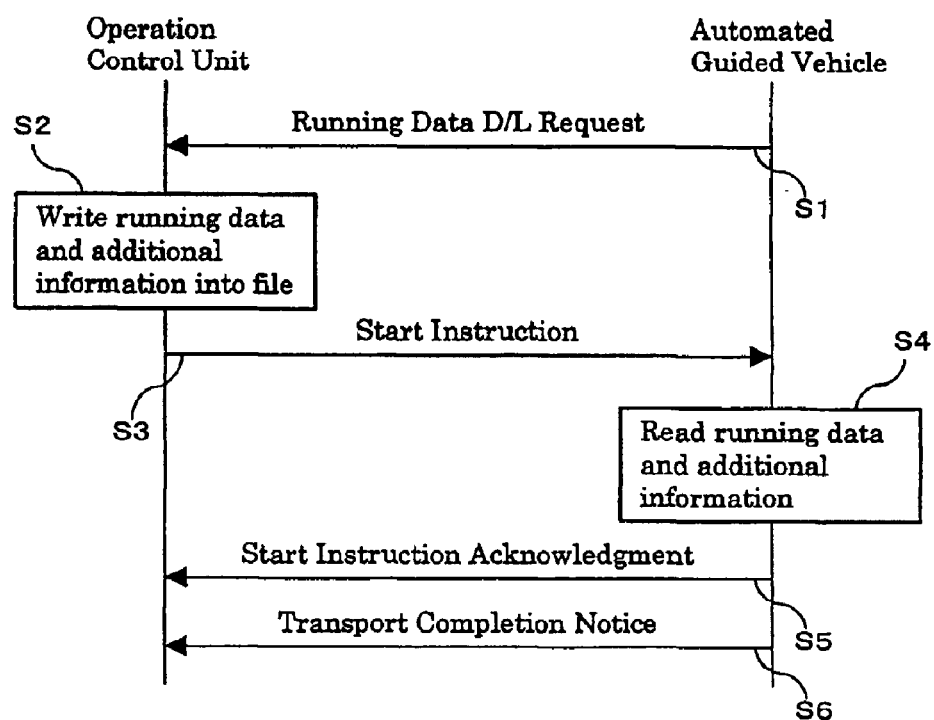
FIG. 4 is a diagram showing how information is passed between an operation control unit 41 and an automated guided vehicle 1 and contents of processing in a first transport start processing.

FIG. 4 is a diagram showing how information is passed between the operation control unit 41 and the automated guided vehicle 1 and contents of processing in a first transport start processing in the present embodiment.

In FIG. 4, first, when a message of running data download (D/L) request is sent from the automated guided vehicle 1 to the operation control unit 41 (step 1, which will be abbreviated e.g. as S1 in the following steps), the operation control unit 41 writes running data and additional information related to a transport into a file (S2) and transmits a start instruction message to the automated guided vehicle 1 (S3). Upon receiving the start instruction message, the automated guided vehicle 1 automatically reads the running data and the additional information stored in the file of the operation control unit 41 into the memory part 12 (FIG. 1) (S4), At this time, the automated guided vehicle 1 obtains not only the running data and the additional information for the coming transport, but also the running data and the additional information needed for the following transport from the operation control unit 41 at a timing corresponding to the transport status of the vehicle itself.

However, it is also possible that the automated guided vehicle does not obtain the running data and the additional information needed for the following transport.

The start instruction message including an identification number of the operation control unit 41 and a task identification number is transmitted to the automated guided vehicle 1. Upon receiving the start instruction message, the automated guided vehicle 1 checks the unit identification number and the task identification number included in the start instruction message. After it is confirmed that this is a start instruction sent from the operation control unit 41, the automated guided vehicle 1 transmits a start instruction acknowledgement to the operation control unit 41 for confirmation of a receipt of the start instruction message (S5) and starts running.

The automated guided vehicle 1 runs from the present position to an instructed loading station in an empty state, receives an article to be transported in the loading station, transports the article to be transported to an instructed unloading station, and supplies the article to the station concerned. Thereafter, when the running data and the additional information needed for the following transport are stored, the automated guided vehicle 1 continues transporting until a series of transports is completed. Then, the automated guided vehicle 1 sends a transport completion notice to the operation control unit 41 (S6).

As described above, the automated guided vehicle 1 can obtain not only the information needed for the present transport but also the information needed for the following transport at a timing according to its own transport status from the operation control unit 41 by itself, so that the transport efficiency of the automated guided vehicle 1 can be improved.

In addition, the above-mentioned embodiment was described by referring to a case of sending a running data D/L request (transport instruction request) from the automated guided vehicle 1. However, it is also possible to start a transport such that the operation control unit 41 monitors the position and the status information of a large number of automated guided vehicles, determines which automated guided vehicle is to be used for the transport and outputs a transport request for the chosen automated guided vehicle to its own file or to the automated guided vehicle. This case will be described in detail by referring to FIG. 5 and FIG. 6.

Figures 5A, 5B, 5C, 5D:
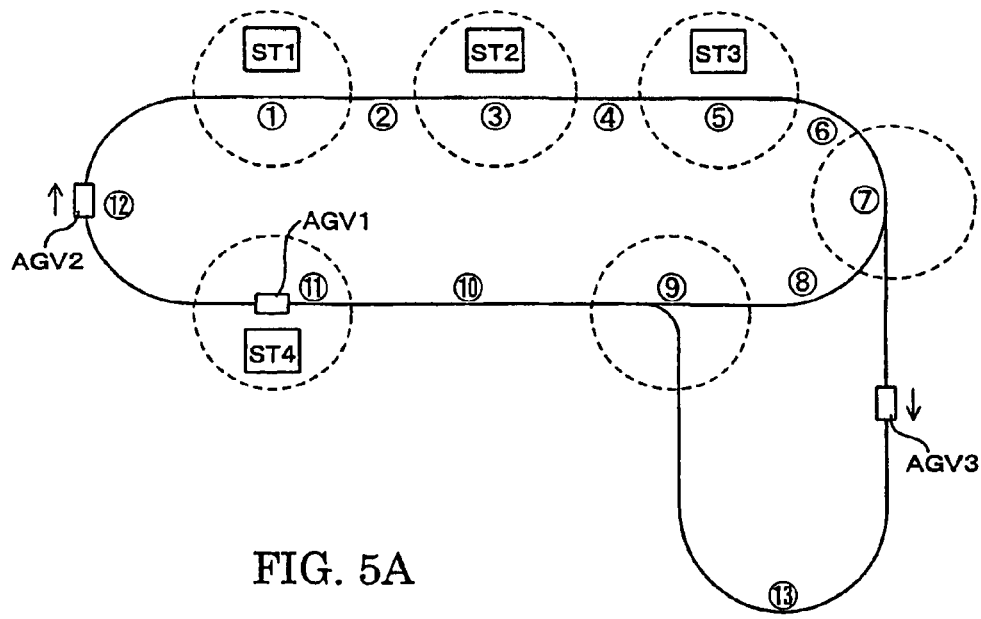
FIG. 5A is a schematic diagram showing the running route of an automated guided vehicle and transfer stations.
FIG. 5B is a schematic diagram showing one configuration example of a position and status information file stored in an automated guided vehicle AGV1 of FIG. 5A.
FIG. 5C is a schematic diagram showing one configuration example of a position and status information file stored in an automated guided vehicle AGV2 of FIG. 5A.
FIG. 5D is a schematic diagram showing one configuration example of a position and status information file stored in an automated guided vehicle AGV3 of FIG. 5A.

FIG. 5 shows one exemplary case in which an automated guided vehicle stores information on its own position and status in the file. FIG. 5A is a schematic diagram showing the running route of the automated guided vehicle and transfer stations positioned along the running routes. In FIG. 5A, transfer stations ST1, ST2, ST3 and ST4 are positioned in the running route, and the automated guided vehicle 1 passes transport articles in these transfer stations. Each block of the running route is indicated by position numbers ①, ② and so forth for identification of its position. For example, a position number ① is given to the ST1, while a position number ② is given to the running route between ST1 and ST2.

FIG. 5B, FIG. 5C and FIG. 5D show one configuration example of a position and status information file stored in automated guided vehicles AGV1, AGV2 and AGV3 of FIG. 5A, respectively. FIG. 5B, FIG. 5C and FIG. 5D show examples in which the "status" is indicated either as "in transport" or "waiting for transport request", but different status such as "charging" or "stopping due to trouble" are also possible.

Figure 6:
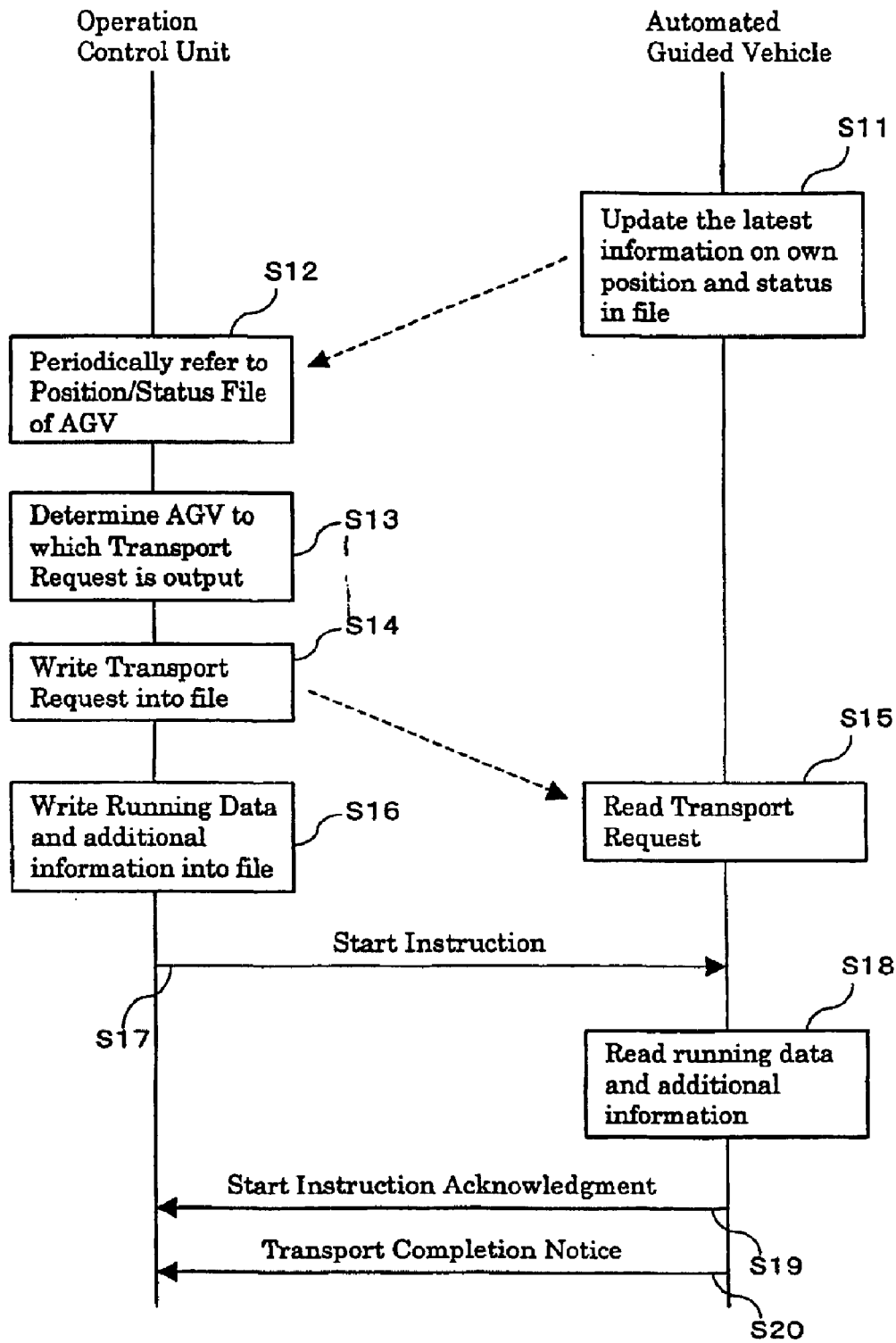
FIG. 6 is a diagram showing how information is passed between an operation control unit 41 and an automated guided vehicle 1 and contents of processing in a second transport start processing.

FIG. 6 is a diagram showing how information is passed between the operation control unit 41 and the automated guided vehicle 1 and contents of processing in a second transport start processing of the present embodiment. Each automated guided vehicle 1 writes and stores its own position and status into the files shown as examples in FIGS. 5B, 5C and 5D, and updates whenever necessary, for example, at a timing when the position or the status has changed (S11). The operation control unit 41 periodically refers to the file stored in each automated guided vehicle 1 (S12) and determines the automated guided vehicle 1 to which a transport request from the factory host computer 40 is output by considering the position and the status of each automated guided vehicle 1 (S13). At this time, for example, it is determined such that the transport request is output to the automated guided vehicle waiting for a transport request that is located closest to the transfer station where articles are passed.

The operation control unit 41 writes the name of the automated guided vehicle to which the transport request is output and the transport request into its own file (S14). The automated guided vehicle periodically refers to the file of the operation control unit 41 and reads those transport requests having the automated guided vehicle's own name (S15). Then, the operation control unit 41 writes the running data and the additional information into the file (S16). The following procedure is the same as the first transport start processing of FIG. 4.

Here, the information on position and status may be provided from the automated guided vehicle to the operation control unit 41 by a message, or the automated guided vehicle may provide the timing to monitor to the operation control unit 41 by a message, and the operation control unit 41 refers to the file stored in the automated guided vehicle at this timing.

Furthermore, the automated guided vehicle 1 also can check by itself whether there is a transport request sent from the factory host computer 40 to the operation control unit 41. In this case, the automated guided vehicle 1 checks timely whether there is a transport request inside the file stored in the operation control unit 41, or at a timing given from the operation control unit 41 to the automated guided vehicle 1, the automated guided vehicle 1 checks whether there is a transport request at this timing.

Furthermore, with respect to the information on start instructions, the automated guided vehicle 1 can check whether there is any information on start instructions in the operation control unit 41 and reads the running data when the information on start instructions is available, or the automated guided vehicle 1 can read the running data at a timing given as a start instruction from the operation control unit 41 to the automated guided vehicle 1.

In addition, a "transport request" means that a request for transport is given to an automated guided vehicle by specifying a place for receiving a transport article and a place to which the transport article is to be sent. On the other hand, a "start instruction" means that an instruction to start running is given to an automated guided vehicle that received a transport request and running data.

Next, it will be explained as to how the automated guided vehicle is controlled when entering the area A1 where the guidance lines 46, 47 are merged.

Figure 7:
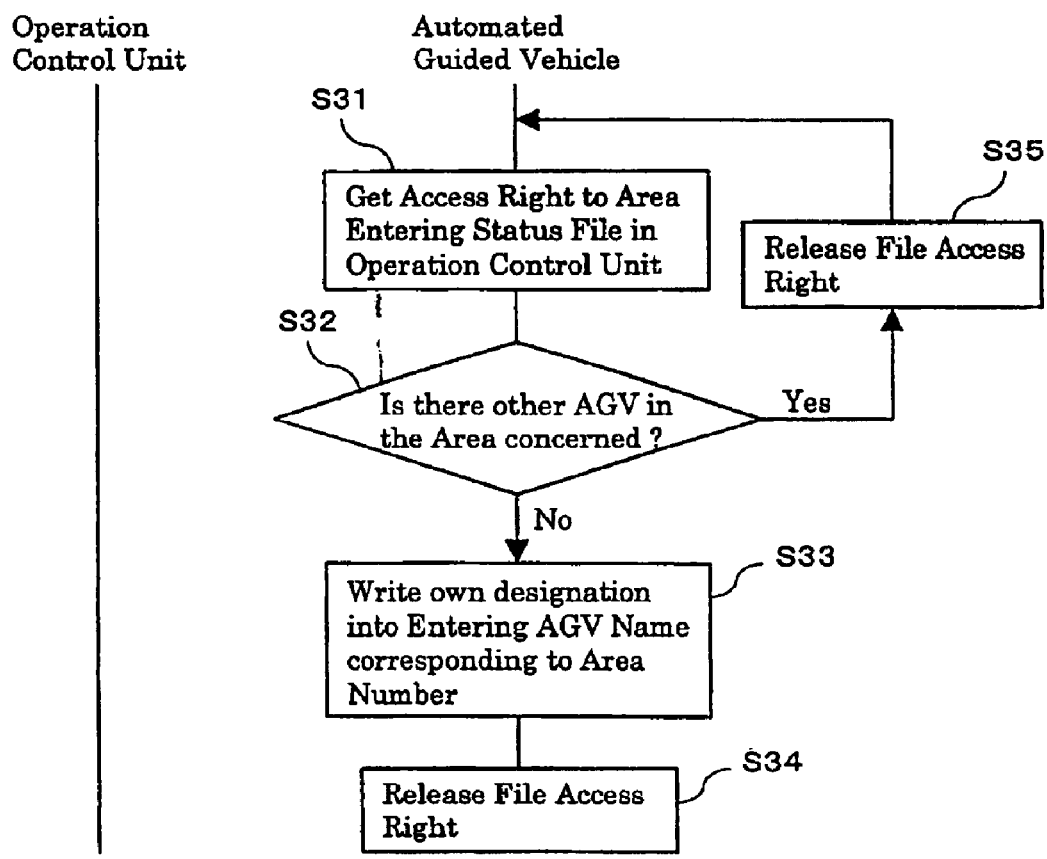
FIG. 7 is a diagram showing how information is passed between an operation control unit 41 and an automated guided vehicle 1 and contents of processing in a first merging control processing.

FIG. 7 is a diagram showing how information is passed between an operation control unit and an automated guided vehicle and contents of processing in a first merging control processing of the present embodiment.

When the automated guided vehicle 1 intends to enter the merging area A1 of the guidance lines 46, 47, first, the automated guided vehicle 1 obtains an access right to the area entering status file shown in FIG. 8 stored inside the operation control unit 41 (S31), reads and refers to the area entering status file and confirms whether there is any other automated guided vehicle entering the merging area A1 (S32). As a result of this judgement, when there is another automated guided vehicle in the merging area A1, the access right to the area entering status file is released, and the automated guided vehicle 1 stops before the entrance of the merging area A1. Under this suspended state, the automated guided vehicle 1 reads the area entering status file periodically and checks whether the other automated guided vehicle is gone.

On the other hand, when there is no other automated guided vehicle in the merging area A1, the automated guided vehicle 1 writes its own name (AGV1) into the name of the entering automated guided vehicle name corresponding to the area number A1 of the area entering status file (S33), releases the access right to the area entering status file, enters the merging area A1 and occupies this area (S34).

In the conventional system, a confirmation section was provided just before entering the merging area A1 to check whether it is allowed to enter, or alternatively, it was programmed such that the automated guided vehicle 1 stops every time at the entrance of the merging area A1 even if there is no other automated guided vehicle besides itself in the merging area A1. However, according to the present embodiment, the automated guided vehicle 1 obtains the access right to the area entering status file stored in the operation control unit 41, and by referring to this area entering status file, the automated guided vehicle 1 can determine by itself whether to enter and occupy the merging area A1. Therefore, it is not necessary to provide such a confirmation section as mentioned above and to take extra running time, and the area productivity also can be improved since it is not necessary to provide extra space therefor. Furthermore, since an automated guided vehicle does not stop every time at the entrance of the merging area, the waiting time of the automated guided vehicle can be shortened significantly, and the transport efficiency can be improved.

Here, the area entering status file may be provided separately for each merging area. In this case, it may be programmed such that the access right to a file is not released while an automated guided vehicle is entering the merging area, and that this area cannot be occupied without obtaining the access right, and thus, the automated guided vehicle must wait before the merging area.

In addition, with respect to passing of information in the merging control processing, it is also possible to program such that the operation control unit 41 checks whether the automated guided vehicle 1 intends to enter the merging area A1, and when the intention of entry is confirmed, refers to the blocking data stored in the operation control unit 41, and that when the status of the merging area A1 is ready for the entry, the operation control unit 41 gives an admission to the automated guided vehicle 1.

Furthermore, as in the conventional system, it may be programmed such that the automated guided vehicle 1 asks the operation control unit 41 whether the merging area A1 is open, and the operation control unit 41 gives an admission to the automated guided vehicle 1 after checking whether there is no other automated guided vehicle. Also in this system, by using a wireless LAN for communication, the communication time can be reduced significantly. Thus, this system has the advantage in that it is not necessary to provide a confirmation section before the merging area A1.

Furthermore, the automated guided vehicle 1 can also check the blocking data shown in FIG. 9 by itself. The operation in this case will be explained by referring to FIG. 10.

Figure 10:
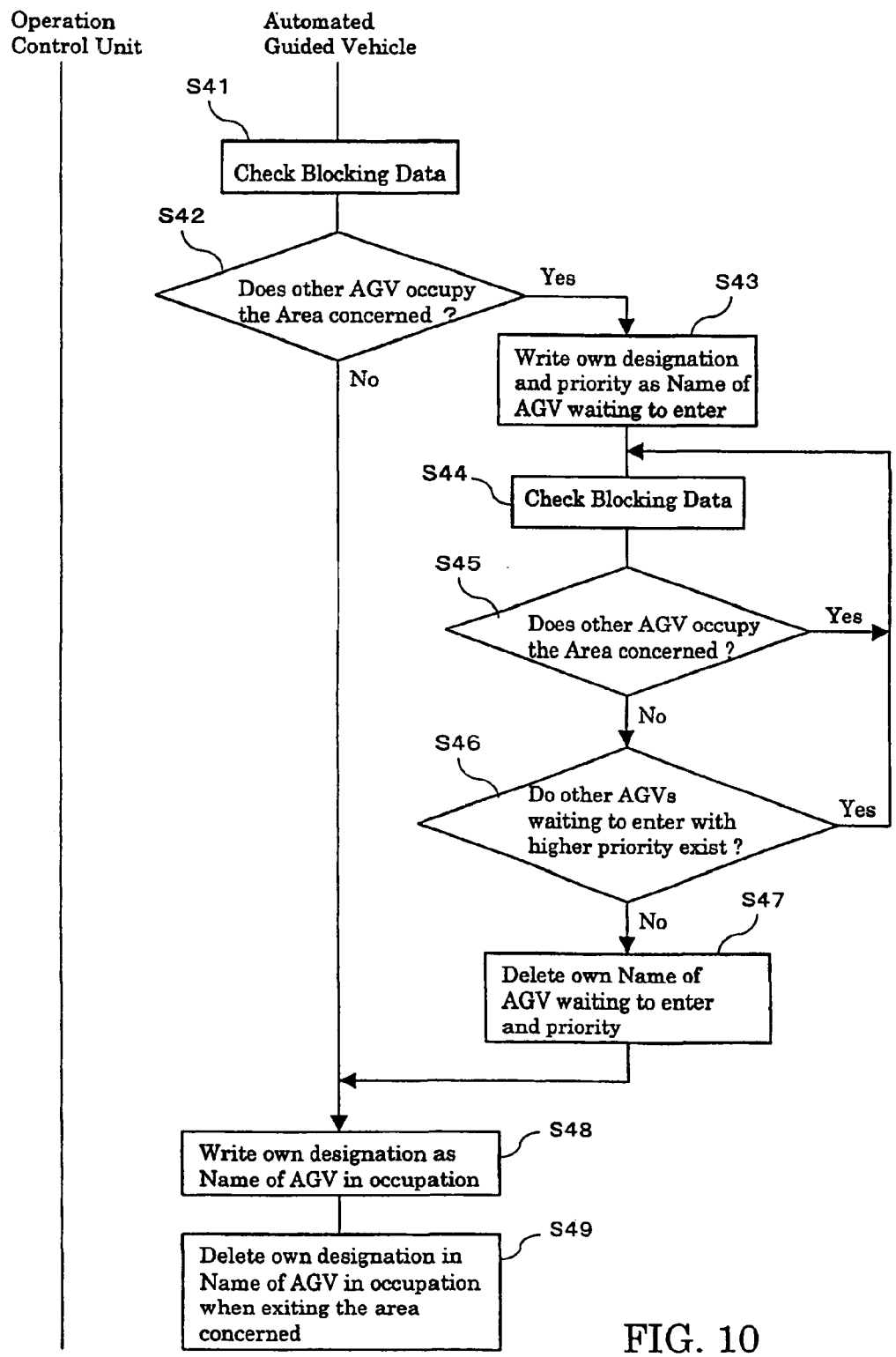
FIG. 10 is a diagram showing how information is passed between an operation control unit 41 and an automated guided vehicle 1 and contents of processing in a second merging control processing.
Figure 11:
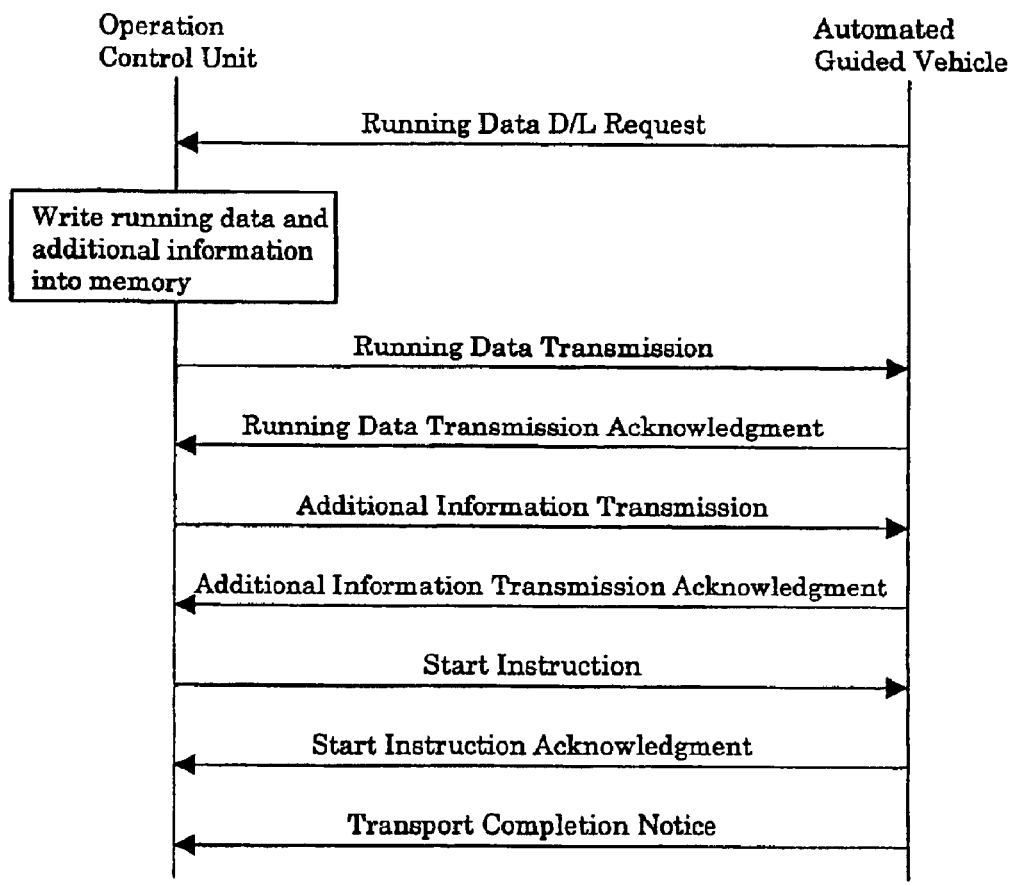
FIG. 11 is a diagram showing how information is passed between an operation control unit and an automated guided vehicle and contents of processing in a conventional transport start processing.
Figure 12:
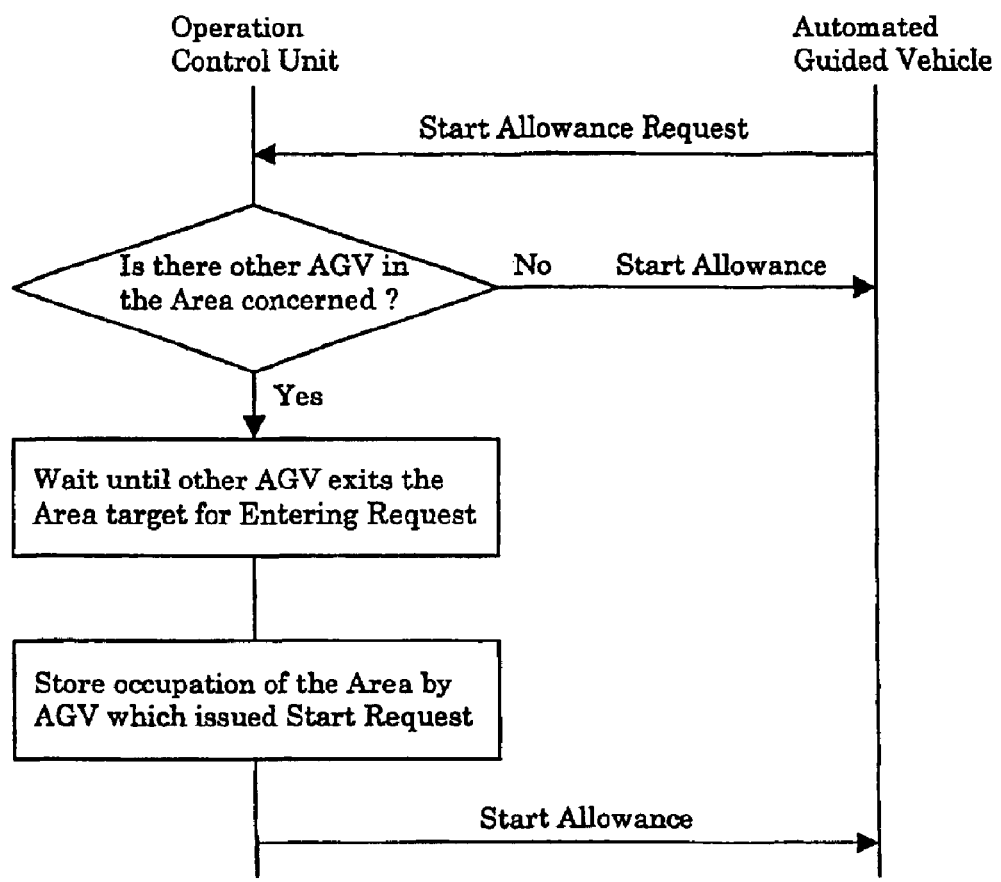
FIG. 12 is a diagram showing how information is passed between an operation control unit and an automated guided vehicle and contents of processing in a conventional merging control processing.

FIG. 10 is a diagram showing how information is passed between an operation control unit and an automated guided vehicle and contents of processing in a second merging control processing of the present embodiment. In addition, these blocking data include, as shown in FIG. 9, an area number, the name of an automated guided vehicle in occupation (AGVn), the name of an automated guided vehicle waiting to enter, and the priority (Pn) of this automated guided vehicle waiting to enter.

When the automated guided vehicle 1 checks the blocking data stored in the operation control unit 41 (S41), it is confirmed whether there is any other automated guided vehicle occupying the merging area A1 concerned (S42). In the case where there is no automated guided vehicle occupying the merging area A1, the automated guided vehicle 1 writes its own designation (AGV1) as the name of the occupying automated guided vehicle (S48).

On the other hand, in the case where the area concerned is occupied by an automated guided vehicle (for example, AGV2), the automated guided vehicle 1 writes its own designation (AGV1) as the name of an automated guided vehicle waiting to enter and its priority (for example, P2: the second highest priority) (S43). Thereafter, when the automated guided vehicle 1 checks the blocking data again (S44) and confirms that the name of the occupying automated guided vehicle (AGV2) is deleted from the blocking data (S45) and that there is no other name of an automated guided vehicle with a higher priority than itself (for example, AGV3 with the highest priority P1) (S46), the automated guided vehicle 1 deletes its own designation (AGV1) as the name of an automated guided vehicle waiting to enter that had been written before (S47), writes its own designation (AGV1) as the name of the occupying automated guided vehicle (S48) and enters the merging area A1.

When the automated guided vehicle 1 exits the merging area A1 that has been occupied, the automated guided vehicle 1 deletes its own designation (AGV1) in the name of the automated guided vehicle in occupation (S49).

Also in this case, as in the conventional system, it may be programmed such that the automated guided vehicle 1 asks the operation control unit 41 whether the merging area A1 is open, and the operation control unit 41 gives an admission to the automated guided vehicle 1 after checking whether there is no other automated guided vehicle. Also in this system, by using a wireless LAN for communication, the communication time can be reduced significantly. Thus, this system has the advantage in that it is not necessary to provide a confirmation section before the merging area A1.

In addition, when the blocking data are checked by the automated guided vehicle 1 at the time a detection mark that is provided before the entrance mark of the merging area A1 at a predetermined distance (for example, 60 cm) is detected, the automated guided vehicle 1 can stop at the entrance mark in the case where the merging area A1 is not open. Here, the above-mentioned distance is predetermined by considering a distance that is sufficient for the automated guided vehicle 1 to stop surely before reaching the entrance of the merging area A1. Furthermore, in the case of using the entrance mark as a detection mark, the entrance mark can be shifted from the merging area and positioned at a predetermined distance (for example, 1 meter) before the merging area, so that the automated guided vehicle 1 can check the blocking data at the time the entrance mark is detected and stop within 1 meter from the entrance mark when the merging area A1 is not open. Here, the above-mentioned distance is predetermined by considering a distance that is sufficient for the automated guided vehicle 1 to stop before reaching the entrance of the merging area A1.

Moreover, by passing information among a plurality of automated guided vehicles via the built-in wireless LAN adapter 11, without interposing the operation control unit 41, and determining whether to enter the merging area, it is also possible to check mutually the routes of the other vehicles and to allow the other vehicle to take the running path. Accordingly, the load on the side of the operation control unit 41 can be reduced.

Furthermore, the information needed for running of the automated guided vehicle 1 in the present embodiment includes running route change information for instructing to switch from the pervious running route to another running route. When the running route to be taken by the automated guided vehicle 1 is already occupied by another automated guided vehicle because of some trouble or work, the automated guided vehicle 1 can read revised running data based on a running route change instruction given from the operation control unit 41, or the operation control unit 41 can transmit two or more running data to the automated guided vehicle 1 so that the automated guided vehicle 1 can change its running route to the one that is suitable. Alternatively, the automated guided vehicle 1 can obtain the running route change information by itself, predicts the time that is necessary for the other suspended automated guided vehicle due to trouble etc. to be restored based on the obtained running route change information, and determines whether to change the running route. To make this judgement, for example, the operation status data such as an average time required for the automated guided vehicle 1 to conduct a transfer work are already stored or gathered from each of the automated guided vehicles in the operation control unit 41, and the automated guided vehicle 1 refers to these running status data.

In the present embodiment, with respect to the form of information to be passed between the automated guided vehicle 1 and the operation control unit 41 stored in one of the external devices connected to the network, there are forms in which the automated guided vehicle and the operation control unit share files, transmit and receive files, pass information by messages, and so forth. In particular, the information in a shared file includes (1) information related to transports, (2) information related to the above-mentioned blocking (intersection) control, (3) the above-mentioned map information (running data), (4) instruction data for conducting work such as transfers, (5) parameters used for speed control etc. of automated guided vehicles, and (6) an expected completion time for each work done by each automated guided vehicle.

The information of the shared file can be stored in the operation control unit, or, depending on the content of the information, in each automated guided vehicle (for example, the information described as (3), (4), (5), (6) above). Alternatively, one of a plurality of automated guided vehicles can be designated as a master automated guided vehicle, and this master automated guided vehicle can store the information.

In the case where the above-mentioned master automated guided vehicle stores the information of the shared file, the operation control unit is not necessarily required.

Furthermore, even if the operation control unit is provided, in the case where the operation control unit fails to function due to some reason, one of the automated guided vehicles that was predetermined as a potential master automated guided vehicle can function as the master automated guided vehicle. In this case, the potential master automated guided vehicle periodically checks whether the operation control unit is functioning correctly. If the operation control unit is functioning, the master automated guided vehicle backs up the above-mentioned information of the shared file into its own memory part at the time of checking. In the event of a malfunction, this vehicle takes over the role as the master automated guided vehicle with the latest backup information of shared file.

Moreover, the present embodiment was described by referring to a case where the automated guided vehicle detects the guidance lines (running tapes) and runs automatically. However, the present invention is not limited to this form of running along the guidance lines and can be applied also to a case where map information is used as running data for automatic running. Here, the map information is information on running routes on the floor where automated guided vehicles run, transfer stations, and positions such as charging positions stored as two-dimensional coordinate values. In this case, the automated guided vehicle possesses position information of each station and position information of the vehicle itself as coordinate data and runs to a target station. For example, the position information of the automated guided vehicle itself can be recognized by detecting the rotation of a running motor relative to the initial position using a rotary encoder or the like and calculating the amount of shifting from the initial position.

In this case, the above-mentioned blocking control can be conducted based on the map information. For example, either by checking the blocking data before merging areas (regions of merging areas are stored as map information) with reference to the map information, or by including information on positions of other automated guided vehicles and areas occupied by these automated guided vehicles in the map information and updating at any time the information on the positions of the automated guided vehicles and areas occupied by the automated guided vehicles along with the movement of itself and the other automated guided vehicles, the automated guided vehicles can run such that the areas occupied by the other automated guided vehicles do not overlap (interfere) with the area occupied by itself.

Furthermore, the present embodiment was described by referring to an example of an automated guided vehicle used for conducting work including a transport of articles in factories. However, the present invention is not limited to this embodiment and can be applied also to an automotive vehicle with the function of self-running, such as vehicles in amusement parks.

When information is passed via a wireless LAN having a data transmission rate of 1.1 Mbps as in the present embodiment, only a waiting time of 3.5×9.6/11000=0.003 seconds is required, while a waiting time of about 3.5 seconds was needed in the past from completion of a transport until a start of the next transport. Therefore, the next transport can be started substantially without any waiting time.

Furthermore, when, for example, 20 units of automated guided vehicles are positioned, it took 10 seconds in the past to update the status data of all 20 units of automated guided vehicles, but it takes only 10×9.6/11000=0.009 seconds according to the present embodiment. Therefore, the present embodiment has the advantage in that the status monitoring function of automated guided vehicles can be conducted easily, and that the real time also becomes excellent.

Furthermore, for conducting a blocking control to avoid collisions between automated guided vehicles, when, for example, 20 units of automated guided vehicles are positioned, it was necessary to provide a run-up of at least 6.6 m before a merging area in the past, which corresponds to an average distance for an automated guided vehicle to run from the time the automated guided vehicle intends to enter a designated merging area until a start allowance is given. However, according to the present embodiment, a required run-up is 6.6×9.6/11000=0.0058 m=5.8 mm, so that essentially a run-up is no longer necessary. Thus, a start allowance can be given without stopping the automated guided vehicle, and it is not only possible to reduce the area of merging areas where only one vehicle can enter but also to conduct the blocking control without stopping the automated guided vehicle. As a result, the transport capability of the automated guided vehicle can be improved.

As described above, the present invention can provide special effects in which the waiting time of an automated guided vehicle can be eliminated substantially by significantly shortening the communication time of various information, the transport efficiency of an automated guided vehicle as well as the operating rate of work stations and production lines as a whole can be improved, the system can be constructed and changed easily by sharing the file in which the information needed for running is stored with each automated guided vehicle, and the flexibility of the operation control system for the automated guided vehicle can be improved.

What is claimed is:

1. An automated guided vehicle for conducting a transport of articles or other work by running a designated running route, the automated guided vehicle comprising
   a wireless local area network adapter for passing or referring to information or software needed for running in the automated guided vehicle by radio between an external device connected to the local area network or between another automated guided vehicle,
   a memory part for storing at least information passed or referred to from the external device or from the another automated guided vehicle and information related to the automated guided vehicle itself, and a control part for controlling the wireless local area network adapter and the memory part.

2. The automated guided vehicle according to claim 1, wherein the automated guided vehicle refers to and timely obtains information needed for running of the automated guided vehicle, which is stored in the external device or in another automated guided vehicle, by itself via the wireless local area network adapter, and running control is conducted by itself based on the obtained information.

3. The automated guided vehicle according to claim 2, wherein as the information needed for running, the automated guided vehicle timely obtains running data indicating running routes by itself via the wireless local area network adapter.

4. The automated guided vehicle according to claim 2, wherein as the information needed for running, the automated guided vehicle timely obtains information on transport requests for the automated guided vehicle by itself via the wireless local area network adapter.

5. The automated guided vehicle according to claim 2, wherein the memory part stores information on the present position or status information indicating the present status so that the external device refers thereto via the wireless local area network adapter and determines an automated guided vehicle to which a transport request is output.

6. The automated guided vehicle according to claim 2, wherein as the information needed for running, the automated guided vehicle timely obtains information on start instructions for the automated guided vehicle by itself via the wireless local area network adapter.

7. The automated guided vehicle according to claim 2, wherein as the information needed for running, the automated guided vehicle timely obtains area entry information that controls the automated guided vehicle from entering a designated area of running by itself via the wireless local area network adapter, confirms whether there is any other automated guided vehicle in the designated area other than itself based on the obtained area entry information, and determines whether to enter the designated area based on the result of judgement.

8. The automated guided vehicle according to claim 7, wherein in the case where the automated guided vehicle confirms that there is no other automated guided vehicle in the designated area other than itself, the automated guided vehicle updates the area entry information, which is stored in the external device or in the another automated guided vehicle, by adding its own identification information thereto, enters the designated area and occupies the designated area.

9. The automated guided vehicle according to claim 7, wherein in the case where the automated guided vehicle confirms that there is an automated guided vehicle in the designated area other than itself, the automated guided vehicle updates area entry standby information that controls the entry standby of the designated area, which is stored in the external device or in the another automated guided vehicle, by adding its own identification information and priority thereto and waits to enter before the designated area.

10. The automated guided vehicle according to claim 7, wherein in the case where the automated guided vehicle confirms that there is no other automated guided vehicle in the designated area other than itself, the automated guided vehicle obtains area entry standby information that controls the entry standby of the designated area, which is stored in the external device or in the another automated guided vehicle, and when it is confirmed that there is no other automated guided vehicle other than itself with a higher priority based on the obtained entry standby information, updates the area entry information, which is stored in the external device or in the another automated guided vehicle, by adding its own identification information thereto, enters and occupies the designated area.

11. The automated guided vehicle according to claim 7, wherein the automated guided vehicle comprises detection means for detecting a mark or other distinction means on a running path provided in a position before an entrance of the designated area by considering a running distance enabling stopping before the entrance, and the automated guided vehicle obtains the area entry information based on a detection of the distinction means by the detection means.

12. The automated guided vehicle according to claim 2, wherein as information needed for running, the automated guided vehicle timely obtains running route change data for instructing a change of routes from a present running route to another running route by itself via the wireless local area network adapter, and runs by changing its running route to the instructed running route based on the obtained running route change data.

13. The automated guided vehicle according to claim 1, wherein the automated guided vehicle enables updating of transport control software stored in the memory part or rewriting data through remote processing via the local area network by the external device.

14. The automated guided vehicle according to claim 1, wherein the automated guided vehicle comprises a melody reproducing device for reproducing music data stored in the memory part, the automated guided vehicle enabling rewriting the music data as appropriate through remote processing via the local area network by the external device.

15. The automated guided vehicle according to claim 1, wherein information on start instructions or other messages passed by radio with the external device or another automated guided vehicle includes at least one selected from an identification number of the external device or of the other automated guided vehicle and a task identification number.

16. An automotive vehicle with the function of self-running, the automotive vehicle comprising a wireless local area network adapter for passing or referring to information or software needed for running in the automotive vehicle by radio between an external device connected to the local area network or between another automotive vehicle, a memory part for storing at least information passed or referred to from the external device or from the another automotive vehicle and information related to the automotive vehicle itself, and a control part for controlling the wireless local area network adapter and the memory part.

17. The automotive vehicle according to claim 16, wherein the automotive vehicle refers to and timely obtains information needed for running of the automotive vehicle by itself, which is stored in the external device or in another automated guided vehicle, via the wireless local area network adapter, and running control is conducted by itself based on the obtained information.

18. An operation control system for an automated guided vehicle including an automated guided vehicle for conducting a transport of articles or other work by running a designated running route and an external device for passing information by radio with the automated guided vehicle, wherein the automated guided vehicle comprises a wireless local area network adapter for passing information by radio with the external device connected to the local area network or with another automated guided vehicle, the external device or one of automated guided vehicles stores information on start instructions for the automated guided vehicle or other information needed for running, and the automated guided vehicle refers to and timely obtains the information needed for running, which is stored in the external device or in another automated guided vehicle, by itself via the wireless local area network adapter, and running control is conducted by itself based on the obtained information.

19. A method for controlling an operation of an automated guided vehicle by passing information by radio between the automated guided vehicle for conducting a transport of articles or other work by running a designated running route and an external device connected to a local area network via a wireless local area network, the method comprising the steps of storing information needed for running including information on start instructions for the automated guided vehicle in the external device or one of a plurality of automated guided vehicles, referring to and obtaining the information needed for running, which is stored in the external device or in another automated guided vehicle, via the wireless local area network in the automated guided vehicle, and conducting running control by itself based on the obtained information.

20. The operation control method according to claim 19, the method comprising storing area entry information that controls the automated guided vehicle from entering a designated running area in an external device or an automated guided vehicle, obtaining the area entry information from the external device or another automated guided vehicle via the wireless local area network in the automated guided vehicle, confirming whether there is any other automated guided vehicle in the designated area other than itself based on the obtained area entry information, and determining whether to enter the designated area based on the result of judgement.

\* \* \* \* \*